United States Patent
Mazzola

(10) Patent No.: US 9,465,238 B2
(45) Date of Patent: Oct. 11, 2016

(54) EYEGLASS SYSTEM AND METHOD OF USE

(71) Applicant: Jonathan Matthew Mazzola, East Hampton, NY (US)

(72) Inventor: Jonathan Matthew Mazzola, East Hampton, NY (US)

( * ) Notice: Subject to any disclaimer, the term of this patent is extended or adjusted under 35 U.S.C. 154(b) by 0 days.

(21) Appl. No.: 14/482,171

(22) Filed: Sep. 10, 2014

(65) Prior Publication Data
US 2015/0185508 A1    Jul. 2, 2015

Related U.S. Application Data

(60) Provisional application No. 61/875,727, filed on Sep. 10, 2013.

(51) Int. Cl.
| | |
|---|---|
| G02C 11/00 | (2006.01) |
| G02C 5/22 | (2006.01) |
| G02C 5/14 | (2006.01) |
| G02C 5/20 | (2006.01) |

(52) U.S. Cl.
CPC ............ *G02C 11/12* (2013.01); *G02C 5/14* (2013.01); *G02C 5/146* (2013.01); *G02C 5/20* (2013.01); *G02C 5/22* (2013.01); *G02C 11/00* (2013.01)

(58) Field of Classification Search
CPC ........ G02C 11/00; G02C 11/12; G02C 5/14; G02C 5/143; G02C 5/20; G02C 5/22
USPC ........ 351/41, 46, 47, 48, 63, 111, 113; 2/12, 2/15
See application file for complete search history.

(56) References Cited

U.S. PATENT DOCUMENTS

| | | | | |
|---|---|---|---|---|
| 1,401,572 A | * | 12/1921 | Willson | A61F 9/02 2/451 |
| 1,914,931 A | * | 6/1933 | Tynan | G02C 7/16 2/13 |
| 3,705,761 A | | 12/1972 | Fujisawa | |
| 4,067,069 A | * | 1/1978 | Slosek | G02C 7/16 2/441 |
| 4,306,779 A | | 12/1981 | Rege | |
| 4,391,498 A | * | 7/1983 | Rengstorff | G02C 3/003 351/111 |
| 4,526,448 A | * | 7/1985 | Hanson | A61F 9/02 16/228 |
| D284,769 S | | 7/1986 | MacWilliamson | |
| 4,848,891 A | | 7/1989 | Lee | |
| D370,931 S | | 6/1996 | Huang | |
| D371,382 S | | 7/1996 | Berthet-Bondet | |
| 5,543,864 A | * | 8/1996 | Hirschman | G02C 5/146 2/449 |
| 5,555,037 A | | 9/1996 | Canavan | |
| D376,613 S | | 12/1996 | Stepan et al. | |

(Continued)

FOREIGN PATENT DOCUMENTS

| | | |
|---|---|---|
| JP | 3088196 U | 6/2002 |
| JP | 1480953 B9 | 3/2010 |

(Continued)

*Primary Examiner* — Bumsuk Won
*Assistant Examiner* — William R Alexander
(74) *Attorney, Agent, or Firm* — Barkume & Associates, P.C.

(57) ABSTRACT

An eyeglass system having a frame, left and right side shields connected to the frame at inset locations from the edge of the frame, arms connected to the side shields, and user select mechanisms for releasing the arms from a retracted position to a protracted position. The protracted position allows the length of the arms to be long enough for the temple tips to rest over the ears of the wearer while the retracted position allows the arms and side shields to close without the left side arm extending past the right side edge of the frame and the right side arm from extending past the left side edge of the frame in the closed position.

2 Claims, 12 Drawing Sheets

(56) References Cited

U.S. PATENT DOCUMENTS

| | | |
|---|---|---|
| D380,003 S | 6/1997 | Wiedner |
| D408,840 S | 4/1999 | Lane |
| D412,179 S | 7/1999 | Hall et al. |
| D423,033 S | 4/2000 | Hall et al. |
| D428,040 S | 7/2000 | Pedeaussaut |
| 6,241,354 B1 | 6/2001 | Schuchard et al. |
| 6,315,408 B1 * | 11/2001 | Huang ............... 351/128 |
| D457,552 S | 5/2002 | Lee |
| 6,427,254 B1 * | 8/2002 | Gardner ............ A61F 9/02 2/444 |
| 6,575,569 B1 | 6/2003 | Castellano |
| D497,933 S | 11/2004 | Moody |
| 6,984,036 B1 * | 1/2006 | Smith ............... G02C 7/16 2/13 |
| D621,866 S | 8/2010 | Yang |
| 8,184,067 B1 | 5/2012 | Braun et al. |
| 8,184,983 B1 | 5/2012 | Ho et al. |
| 8,223,024 B1 | 7/2012 | Petrou |
| 8,235,529 B1 | 8/2012 | Raffle et al. |
| 8,508,830 B1 | 8/2013 | Wang |
| 2005/0078268 A1 * | 4/2005 | Froissard ............. G02C 5/2254 351/46 |
| 2011/0075092 A1 | 3/2011 | Nordyke |
| 2011/0181830 A1 * | 7/2011 | Iimura ............... 351/153 |
| 2013/0069985 A1 | 3/2013 | Wong et al. |

FOREIGN PATENT DOCUMENTS

| | | |
|---|---|---|
| WO | 2012074411 | 6/2012 |
| WO | 2013062654 A1 | 5/2013 |
| WO | 2013074613 A1 | 5/2013 |
| WO | 2013082034 A1 | 6/2013 |

* cited by examiner

EYEGLASS SYSTEM AND METHOD OF USE

TECHNICAL FIELD

The present invention relates to an eyeglass system. More particularly, the present invention relates to an eyeglass system having side shields and retractable arms.

BACKGROUND OF THE INVENTION

Eyeglasses are useful for many reasons beyond correcting the vision of the wearer. Tinted eyeglasses protect the wearer from harmful sunrays, safety glasses protect the wearer from flying debris, and Google glass allows the wearer to interact with a computer. In each of these uses, glasses with side shields provide additional benefits, such as increased protection against sunlight or particles coming from side angle. A number of prior art side shield designs clip onto the frame or the arms of the glasses. But these separate sections can be lost or broken more easily. Other prior art side shields that are permanently mounted to the glasses are less fashionable and difficult to store in a sleeve or case.

SUMMARY OF THE INVENTION

The present invention is an eyeglass system (eyeglasses) having a frame, left and right side shields connected to the frame at inset locations, arms connected to the side shields, and user select mechanisms for releasing the arms from a retracted position to a protracted position. The frame has a left side edge and a right side edge and the side shield are hingedly connected to the frame inset from the side edges, i.e. the left side shield is hingedly connected at a location inset from the left side edge and the right side shield is hingedly connected at a location inset from the right side edge. In an open condition, the left and right side shields extend lateral to the frame. Changing from the open condition to a closed condition, each side shield rotates about its hinge connection until it is substantially parallel to the frame. The open condition allows the eyeglasses to be worn by a user while the closed condition allows the user to store the eyeglasses in a sleeve or case.

In addition, the left arm is coupled to the left side shield and the right arm is coupled to the right side shield and each arm has a retracted position and a protracted position. The retracted position keeps the left side arm from extending past the right side edge of the frame and the right side arm from extending past the left side edge of the frame when the side shields are in the closed condition.

In order to provide the user with the ability to release the arms from the retracted position to the protracted position, the left and right arms may be formed from two sections, a first section closest to the side shield and a second section having arm triggers and a tip that rests on the ear of the wearer. Each section may contain a cavity for housing components, such as a biasing mechanism that is compressed when the arms are in the retracted position and released when the arms are in the protracted position. In the retracted position, the second section of the arm is retracted into the first section of the arm. When a user releases the arms from the retracted position, the biasing mechanism pushes the second section of the arm out of the first section of the arm. Locking hooks may hold the arms in the protracted and retracted positions and user select mechanisms cause the arms to switch from retracted to protracted positions and from protracted to retracted positions.

In another embodiment, a method of using the eyeglass system includes rotating side shields and attached arms to an open condition, releasing the arms from a retracted position to a protracted position, and putting the eyeglass system over the eyes of the wearer with the arms resting above the ears of the wearer and the side shields encompassing the eyes. The method further includes removing the eyeglass system from the wearer, pressing a release mechanism that allows the arms to be retracted, pushing a second section of the arm into a first section of the arm to a retract position, and rotating the side shields to a closed condition.

DETAILED DESCRIPTION

Before the present invention is described, it is to be understood that this disclosure is not limited to the particular embodiments described, as these may vary. It is also to be understood that the terminology used in the description is for purposes of describing the particular versions or embodiments only, and is not intended to limit the scope. It is to be understood that each specific element includes all technical equivalents that operate in a similar manner. In addition, a detailed description of known functions and configurations will be omitted when it may obscure the subject matter of the present invention.

Figure 1:
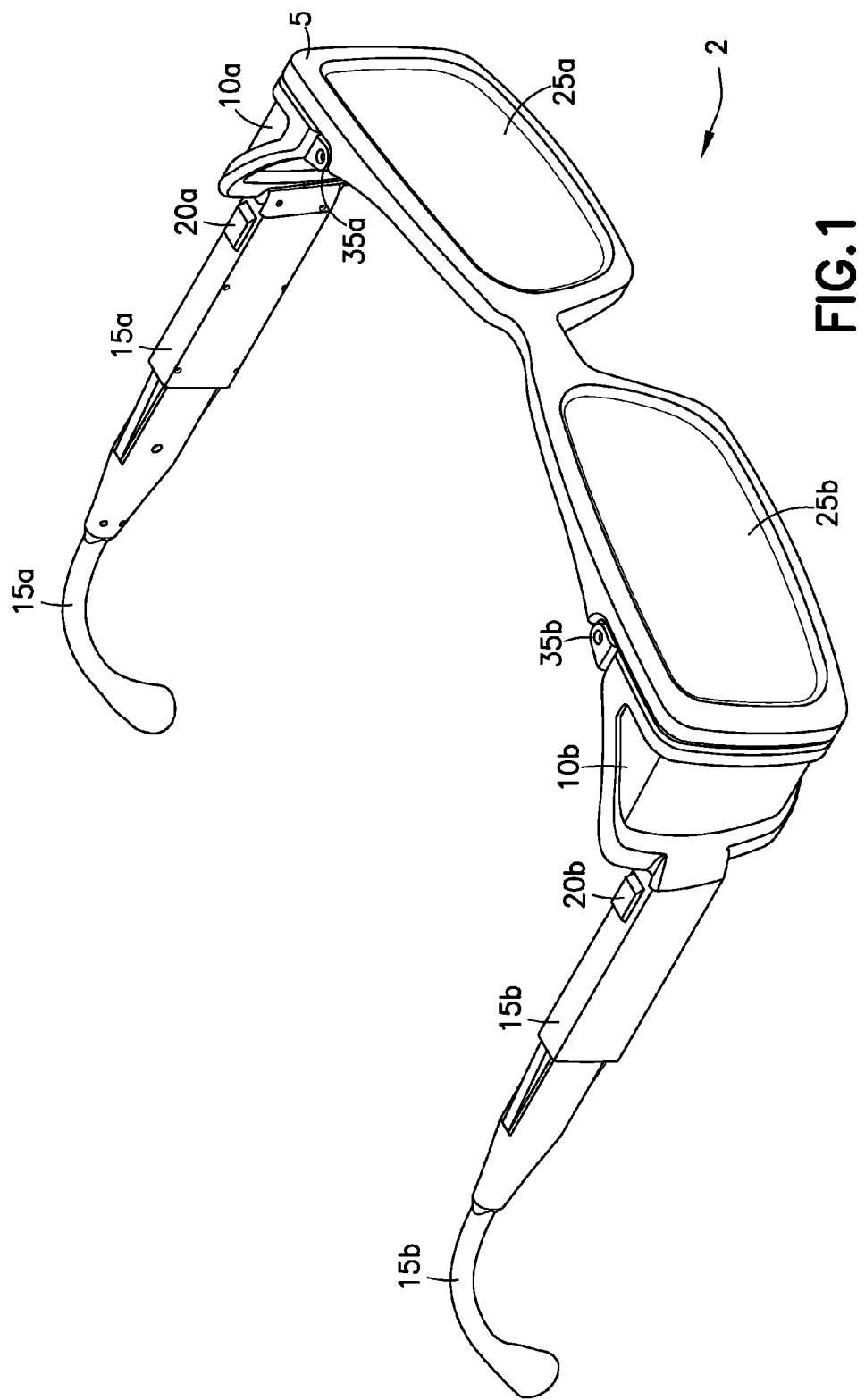
FIG. 1 is a perspective view of the eyeglass system in an open condition with arms in a protracted position.

Referring to FIG. 1, shown is an eyeglass system 2 (eyeglasses or glasses) having a frame 5, left and right side shields 10(*a* & *b*) connected to the frame 5 at inset locations, arms 15(*a* & *b*) connected to the side shields 10(*a* & *b*), and user select mechanisms 20(*a* & *b*) for releasing the arms 15(*a* & *b*) from a retracted position to a protracted position. The reference numbers for components on the left side of the eyeglass system 2 will have an "a" as part of the reference number, while the reference numbers for components on the right side of the eyeglass system 2 will have a "b" as part of the reference number. When the components are referred to generally, it should be understood that both "a" and "b" are implicit. The frames 5 may be any shape, including rectangular and oval. The frames 5 may be formed from metal, plastic, acetate, thermoplastic, thermosetting polymers or any material, as known by one skilled in the art. The frames 5 may hold lenses 25(*a* & *b*) made from glass, plastic, or mesh.

Figure 2:
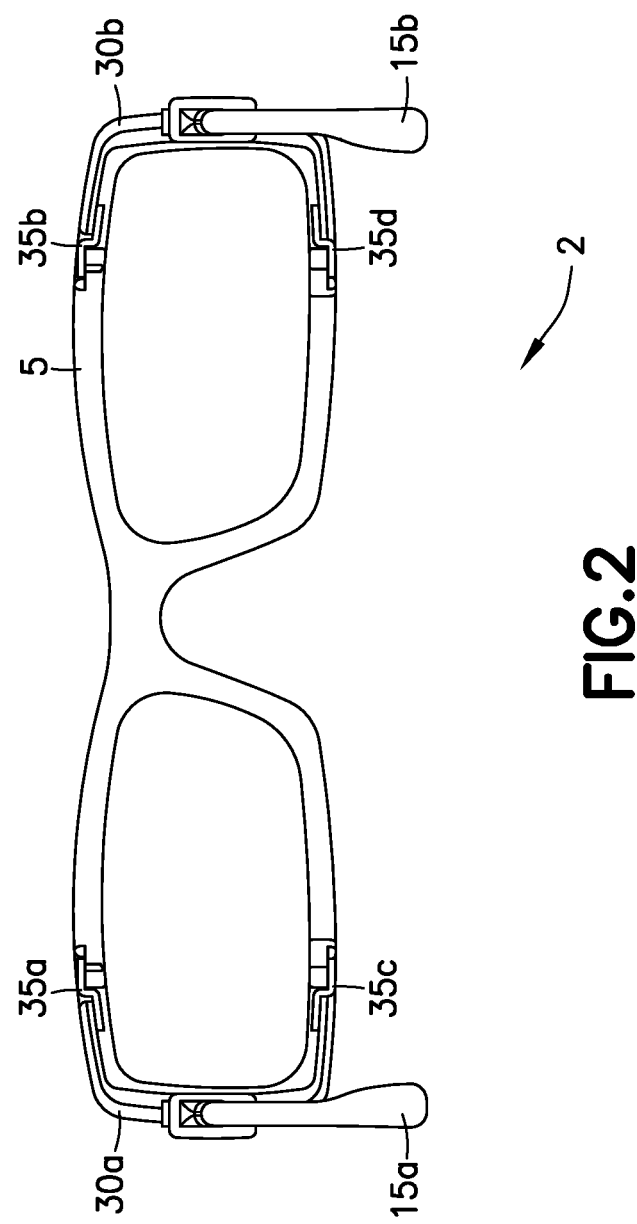
FIG. 2 is a rear view of the eyeglass system showing the preferred placement of the side shield hinges.

As shown in FIG. 2, the frame 5 has a left side edge 30*a* and a right side edge 30*b* and the left side shield 10*a* is hingedly connected at a location inset from the left side edge 30*a* and the right side shield 10*b* is hingedly connected at a location inset from the right side edge 30*b*. In the preferred embodiment, there are two hinges 35*a* & 35*c* (and 35*b* & 35*d*) connecting the side shields 10(*a* & *b*) to the frames 5. One hinge 35*a* (or 35*b*) is connected the top edge of the frame 5 and the other hinge 35*c* (or 35*d*) is connected to the bottom edge of the frame 5. The hinges 35 may be a stainless steel pin or screw or a similar design as known by one skilled in the art. In the preferred embodiment the top 35(*a* & *c*) and bottom hinges 35(*b* & *d*) are both inset from the side edges 30*a* & 30*b* at the same distance. The distance to the pair of hinges 35(*a* & *c*) (or 35(*b* & *d*)) for the glasses 2 shown in these figures is 22 mm, but this distance vary for different sizes and styles of lenses 25 and shields 10. For example, the narrower height and/or wider length of the frames 5 will require the side shields 10 to curl in more on the top and bottom to compensate for any gaps that would allow light/glare, dirt, or debris to get past the glasses and in to the eye. This would require a greater inset distance. Conversely, large oval frames 5 would not need such a severe "c" curve but more of a parenthesis "(" curve, requiring less of an inset.

Figure 3:
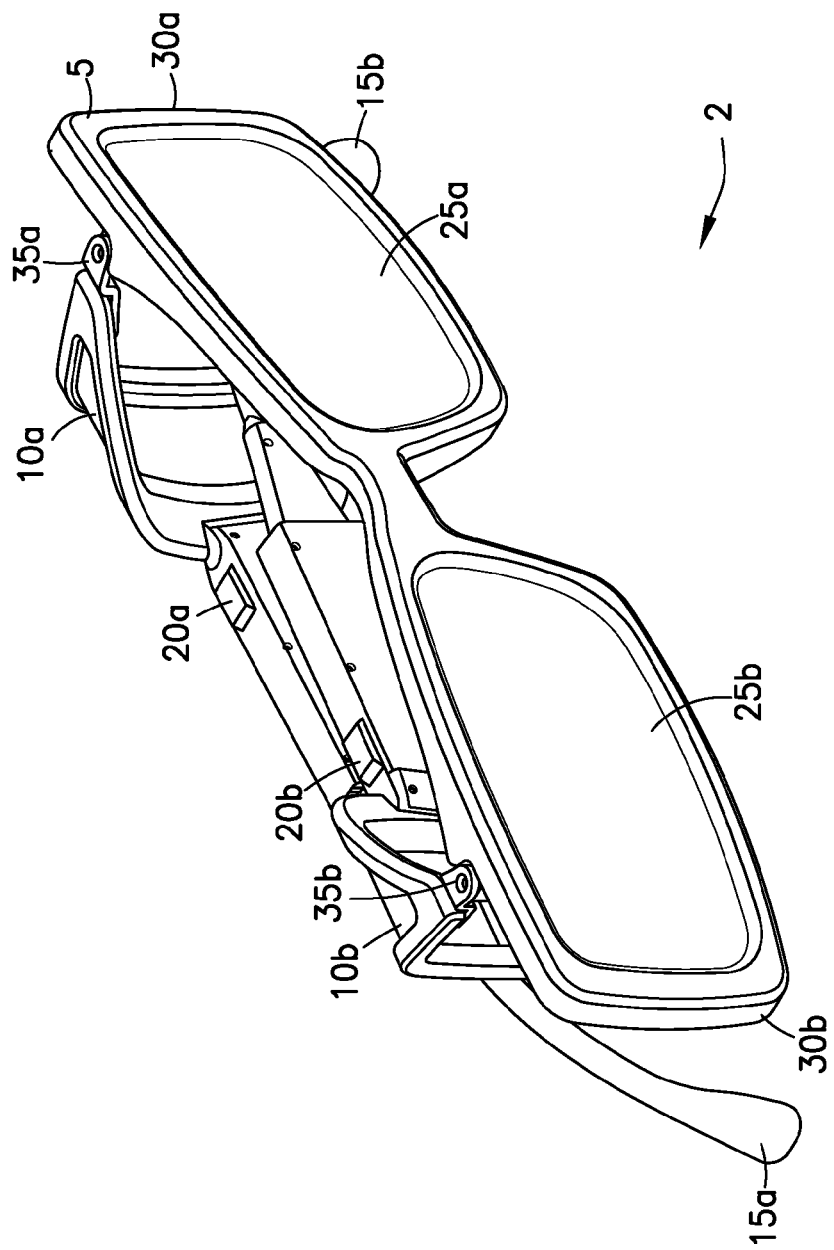
FIG. 3 is a perspective view of the eyeglass system in a closed condition.
Figure 4:
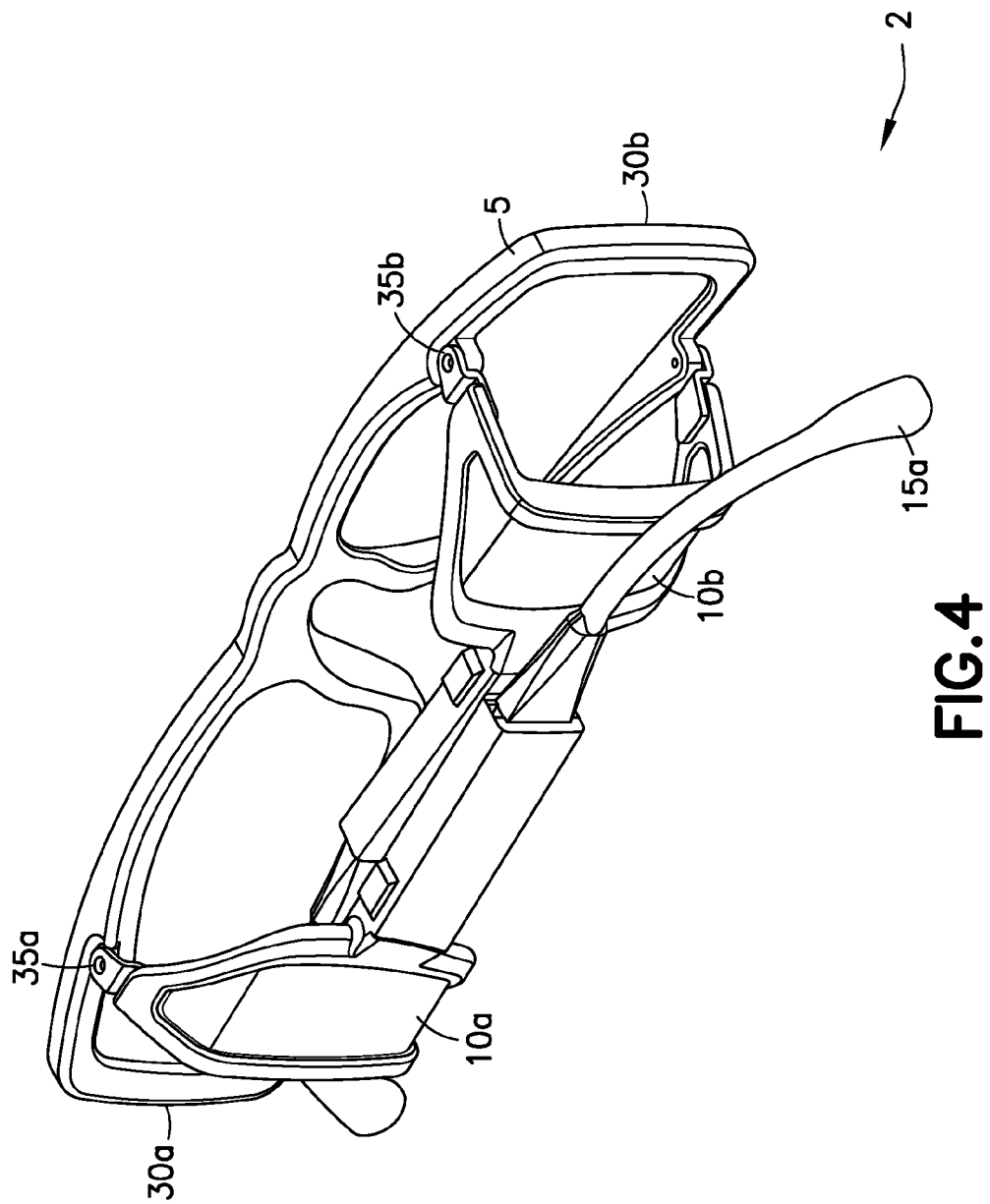
FIG. 4 is a rear perspective view of the eyeglass system in a closed condition.

In the open condition, as shown in FIG. 1, the left and right side shields 10(*a* & *b*) extend lateral to the frame 5 allowing the eyeglasses 2 to be worn by a user. In the closed condition, as shown in FIGS. 3 and 4, each side shield 10(*a* & *b*) may been rotated about its hinge 35 connection until it is substantially parallel to the frame 5; thereby allowing the user to store the eyeglasses 2 in a sleeve or case. As described above, the side shields 10 cut down glare from the sun and protect against particles hitting the eyes while allowing the wearer to use his/her peripheral vision. The side shields 10 may be made from glass, plastic, or mesh. The side shields 10 may also have a frame made from metal, plastic, or any material as known by one skilled in the art. In the preferred embodiment, mesh side shields 10 are used to provide protection for the wearer against objects coming into contact with an eye. In other embodiments, tinted plastic or glass side shields 10 provide protection from the harmful rays of the sun, but in this embodiment, there is a reduction in airflow.

Figure 5:
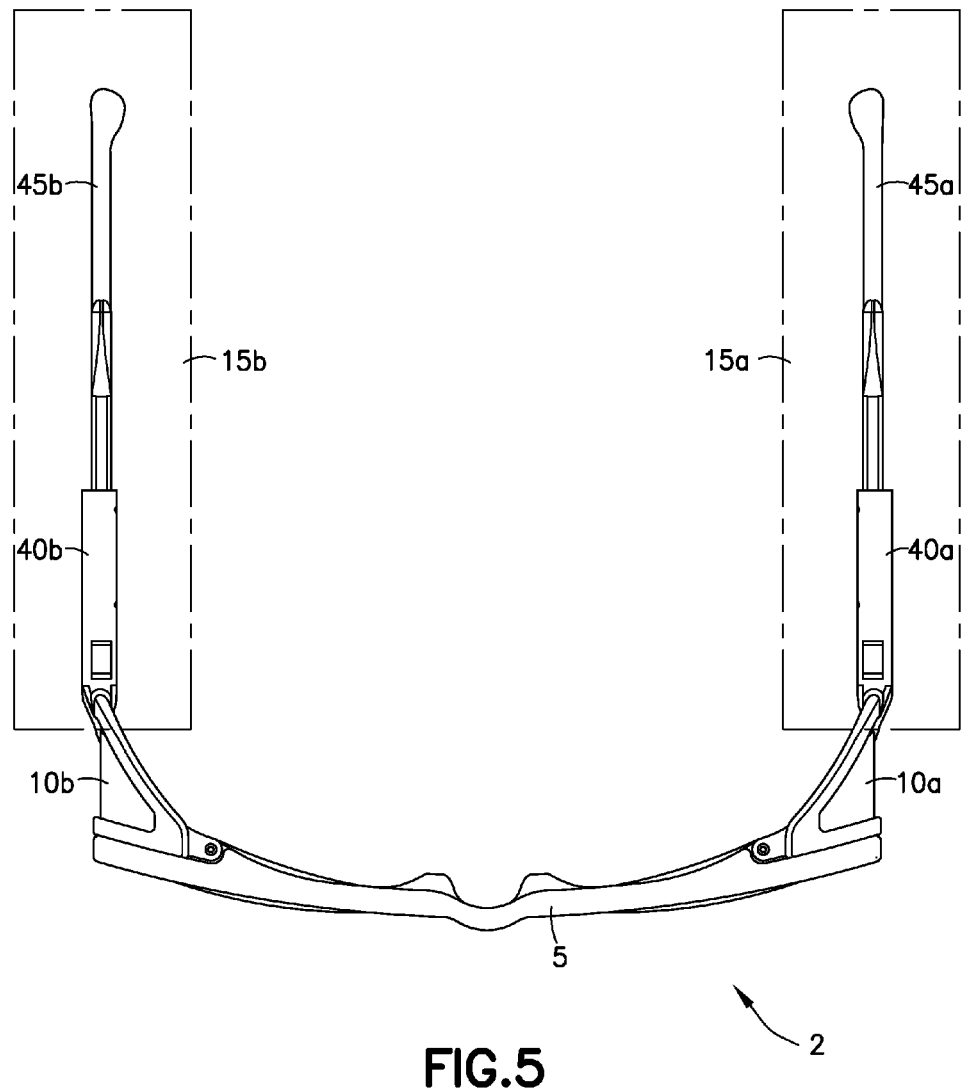
FIG. 5 is a top view of the eyeglass system with arms in a protracted position.
Figure 6:
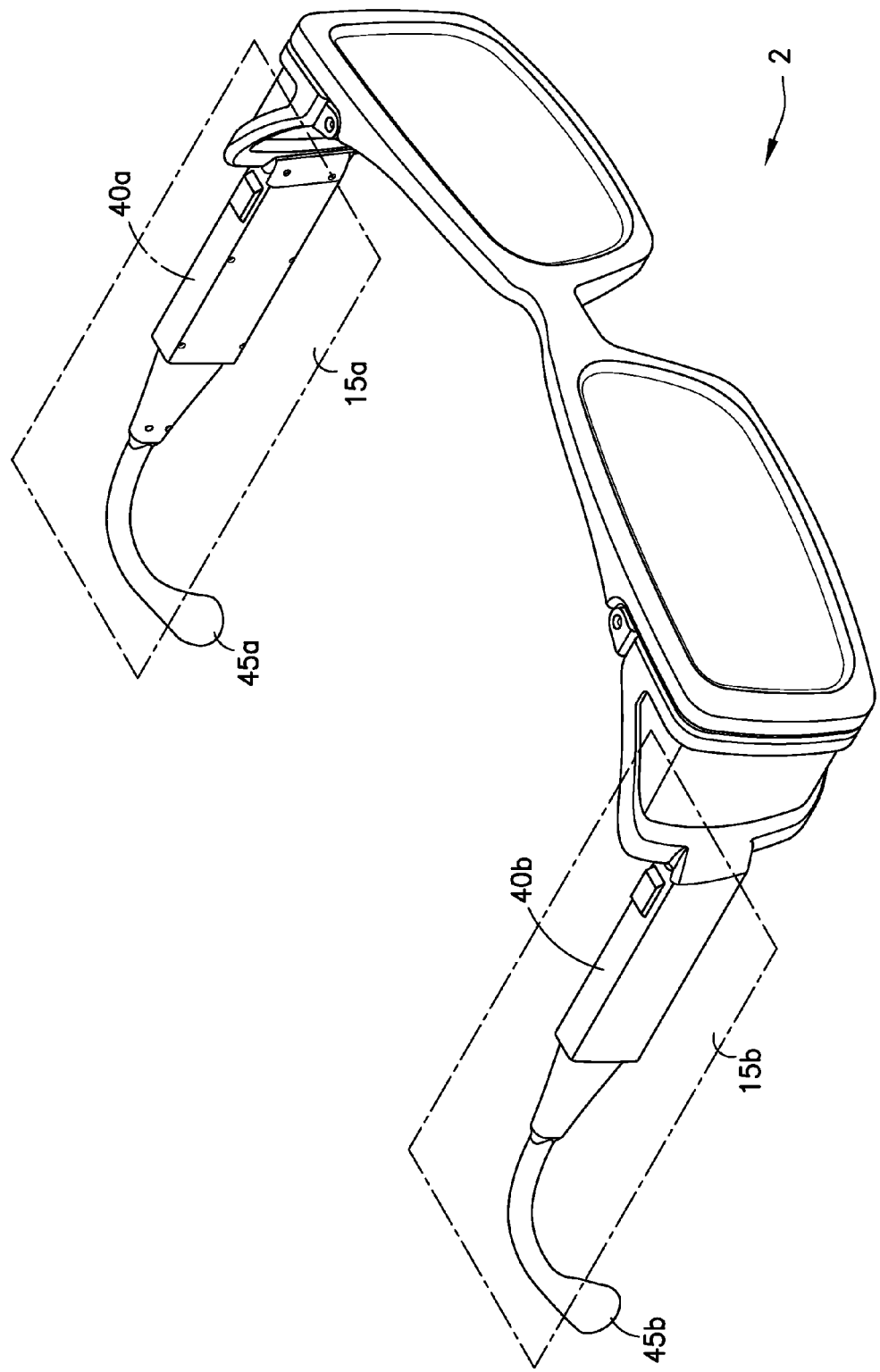
FIG. 6 is a perspective view of the eyeglass system in an open condition with arms in a retracted position.

Referring to FIG. 5, in the preferred embodiment, the arms 15(*a* & *b*) contain two sections 40 & 45. The first section 40 is a spring housing temple section, which is located closest to the side shields 10(*a* & *b*) and the second section 45 is the temple tip and arm trigger housing, which is the back section that rests over or near the ear of the wearer. An important feature of the present invention is that each arm 15 has a protracted position and a retracted position. The protracted position allows the length of the arms 15 to be long enough for the temple tip 45 to rest over the ear of the wearer while the retracted position allows the arms 15 and side shields 10 to close without the left side arm 15*a* extending past the right side edge 30*b* of the frame 5 and the right side arm 15*b* from extending past the left side edge 30*a* of the frame 5 in the closed position, as shown in FIGS. 3 and 4. Referring to FIG. 6, in the retracted position, part of the second section 45 of the arm 15 retracts into the first section 40 of the arm 15.

Figure 7:
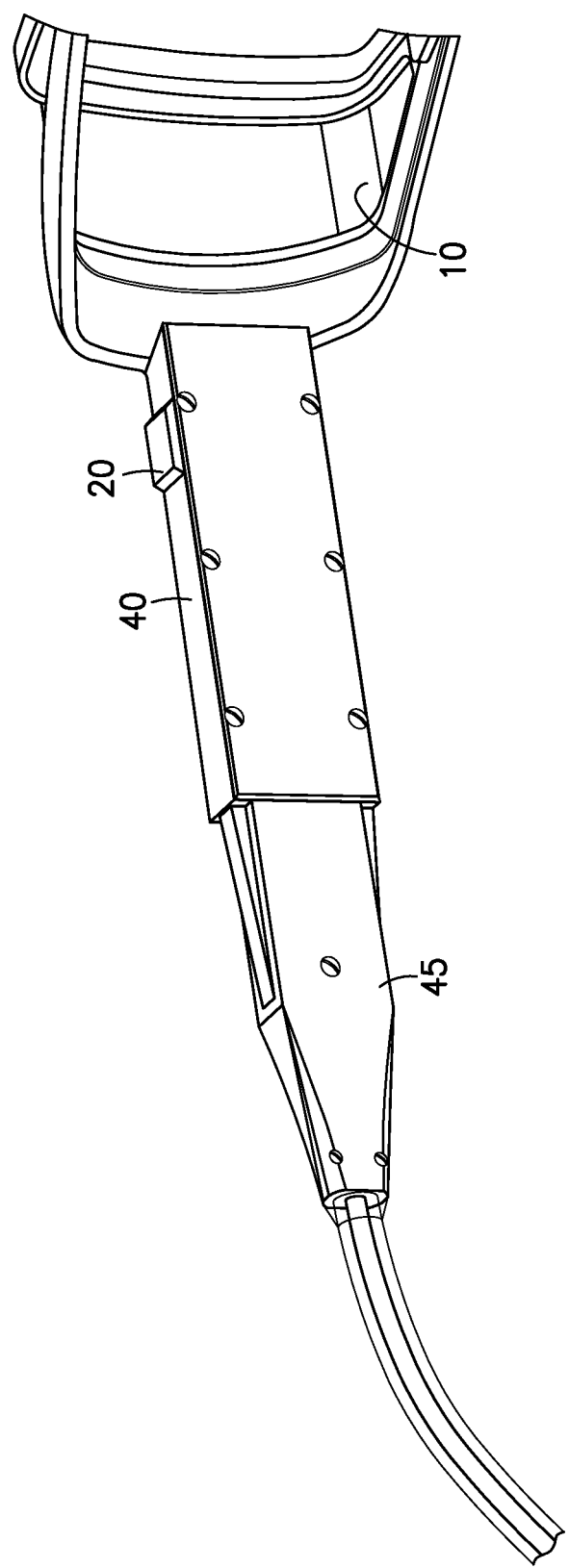
FIG. 7 is a view of an arm connected to a side shield with the arm cavity housing covered.

Referring to FIG. 7, in order to provide the retraction and protracted positions, the first 40 and second 45 sections of each of the arms 15 each contain a cavity for housing components that allow the second section 45 to retract into the first section 40 and for locking the arms 15 in the retracted position and the protracted position. Plates may cover the components in the cavities to protect them. The plates may be metal and may be screwed to the arm 15. A wearer (user) may release the second section 45 from its retracted position by pressing the button 20 (user select mechanism) on top of the arm 15 near the side shields 10 allows. The button is shown in its preferred embodiment and location, but one skilled in the art understands that the button 20 can be any shape or form and located in various positions on the arm 15 or on shield 10. A wearer may retract the second section 45 into the first section 40 by pressing top and bottom arm triggers (user select mechanisms) on the second section 45 of the arm 15.

Figure 8:
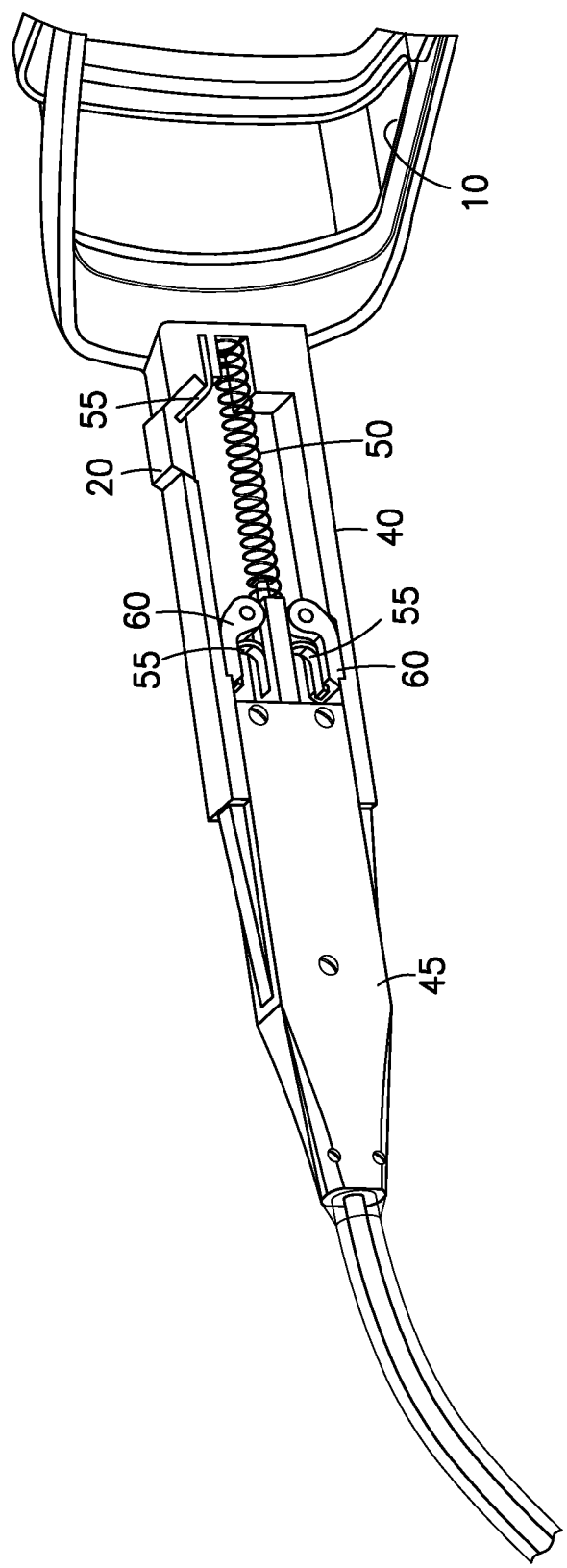
FIG. 8 is a view of an arm connected to a side shield with the first section of the arm uncovered displaying the preferred embodiment of the biasing mechanism.
Figure 9:
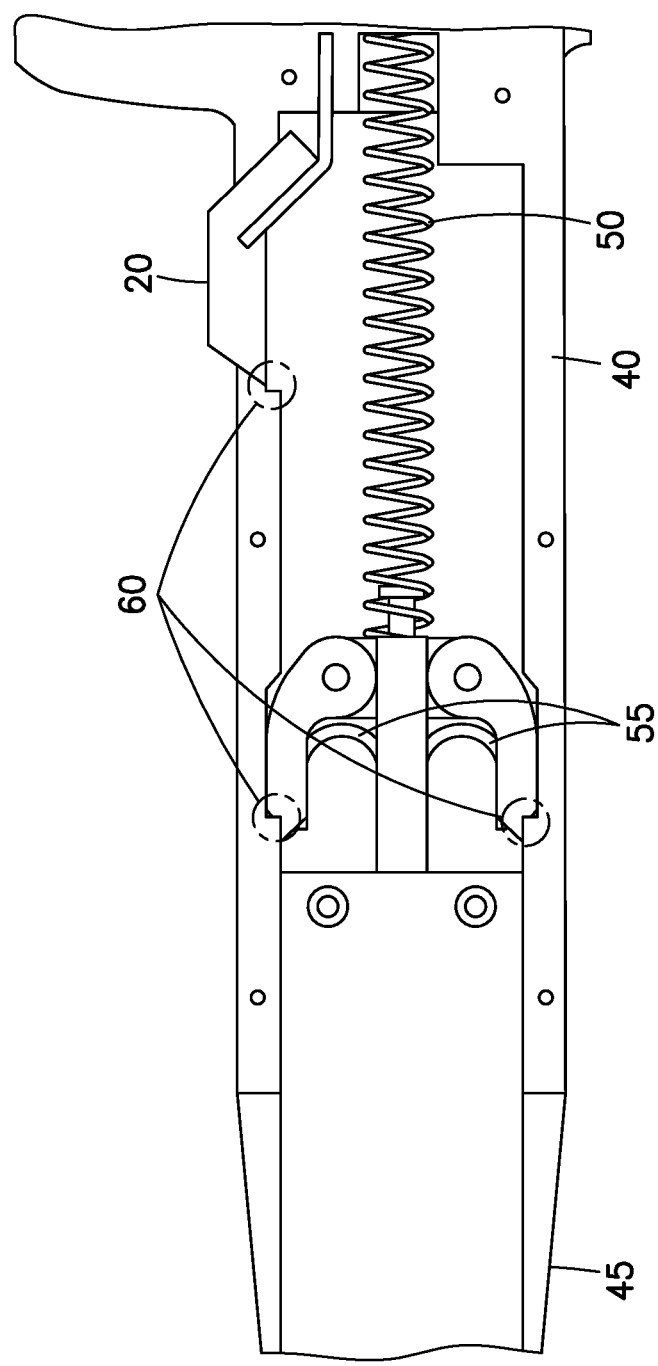
FIG. 9 is a view of the components in the cavity of the first section of the arm.
Figure 10:
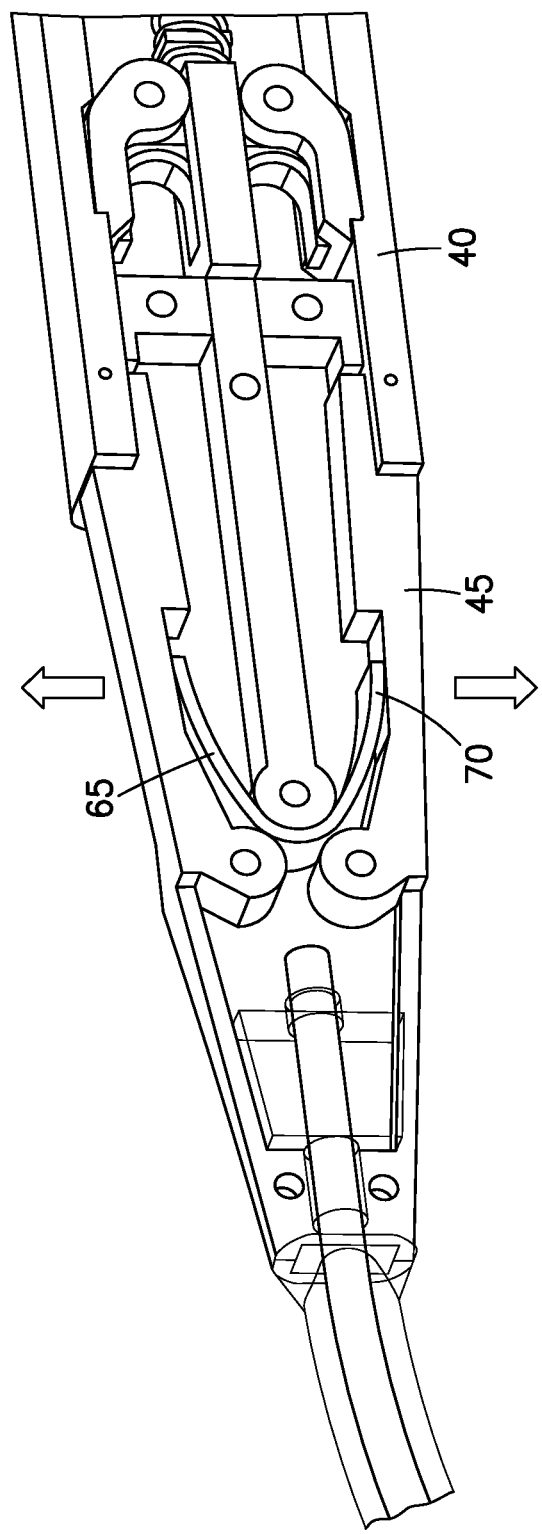
FIG. 10 is a view of the components in the cavity of the second section of the arm.
Figure 11:
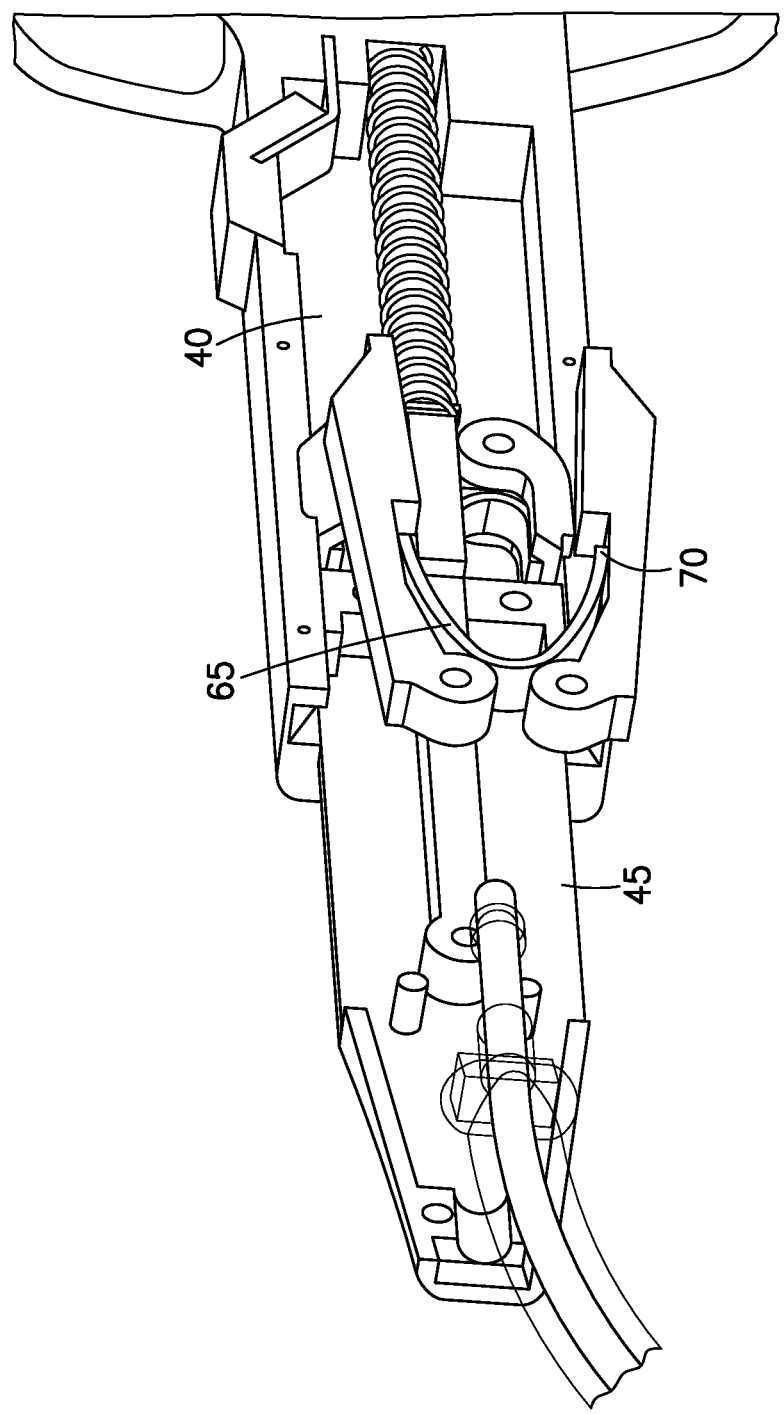
FIG. 11 is a view of the components in the cavities of the first and second sections of the arm in a protracted position.
Figure 12:
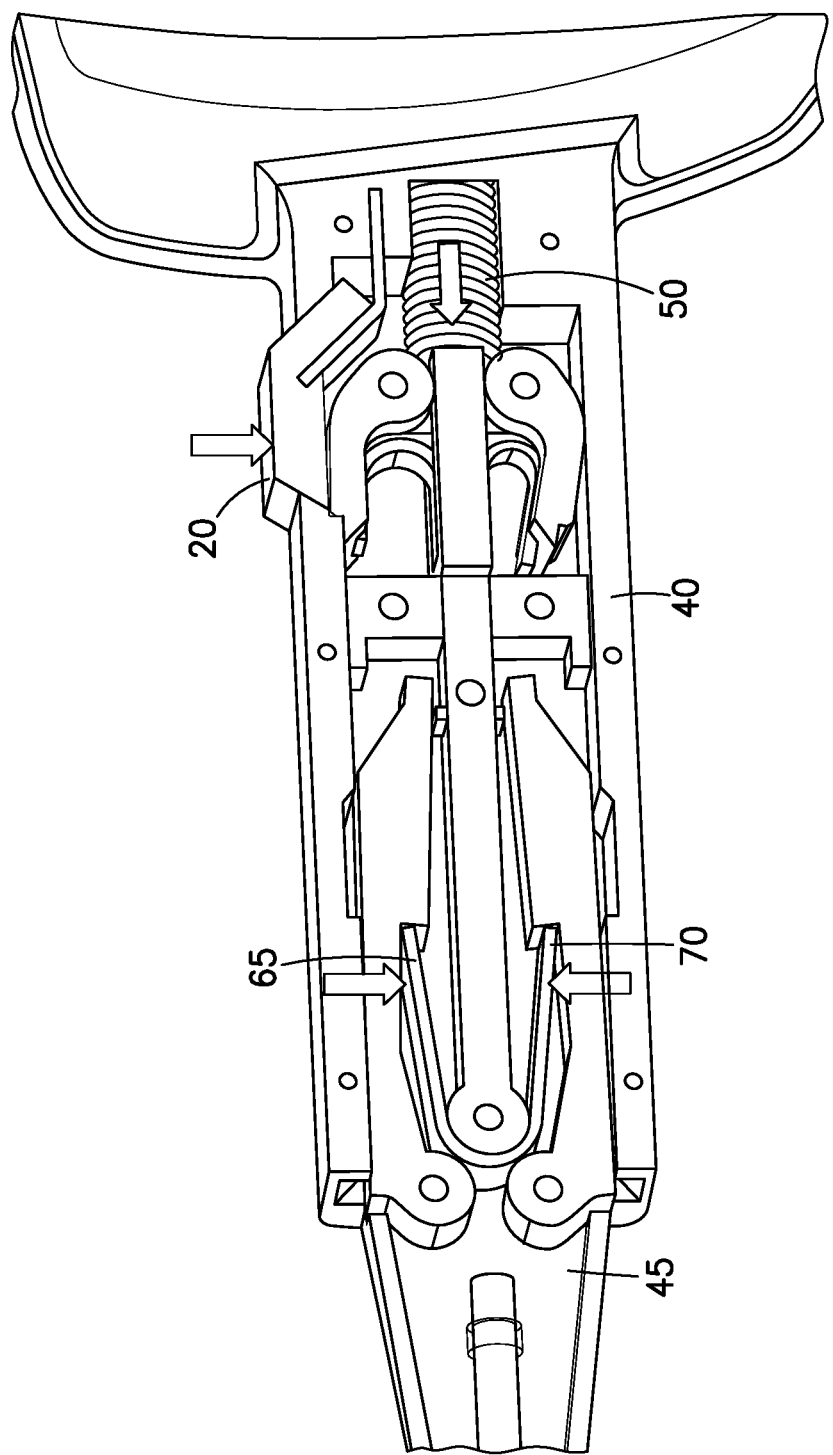
FIG. 12 is a view of the components in the cavities of the first and second sections of the arm in a retracted position.

Referring to FIG. 8, in the first section 40 a biasing mechanism 50, such as a coiled spring, pushes the second section out and away from the side shields 10 into the protracted position. Referring to FIG. 9, the biasing mechanism 50 pushes the second section 45 out until the biasing mechanism 50 is locked into the protracted position. The biasing mechanism 50 is locked into the protracted position by spring steels 55 that push locking hooks 60 into grooves. Referring to FIG. 10, in the protracted position, spring steels 55 in the second section 45 of the arm 15 push out the top 65 and bottom arm triggers 70. Referring to FIG. 11, when the wearer presses the top 65 and bottom 70 arm triggers and pushes the second section 45 of the arm 15 into the first section 40 of the arm 15, the locking hooks 60 come out of their groves. Referring to FIG. 12, as the wearer continues to push the second section 45 of the arm 15 into the first section 40 of the arm 15, the biasing mechanism is compressed and locked into the retracted position. The biasing mechanism 50 is locked into the retracted position by spring steels 55 that push locking hooks 60 into grooves. The arm 16 will stay in this retracted position until the push button 20 is pressed causing the locking hooks 60 to come out of their grooves. Once the locking hooks 60 come out of their grooves, the biasing mechanism 50 "pops" the second section 45 out of the first section 40 into the protracted position.

Although the preferred embodiments of the invention have been described above by way of example only, it will be understood by those skilled in the art that modifications may be made to the disclosed embodiments without departing from the scope of the invention. For example, different biasing mechanisms 50 may be used to retract and protract the arms 15 and different locking mechanisms 60 may be used to lock the arms 15 in the retracted position and the protracted position.

Additionally, the present invention may incorporate other components, such as computer components, similar to Google glass, to allow the user to interface with a computer. For example, the components may be incorporated into the arms 15, and the side shields 10 may provide extra surface area for capturing eye movements. Similarly, the present invention may incorporate blue tooth or wireless elements into the glasses 2 to work with an existing external phone or incorporate the components of a phone into the glasses 2. These features will allow the wearer to use voice commands to control a variety of other technologies.

Furthermore, various embodiments described herein or portions thereof can be combined without departing from the present invention. For example, the side shields 10 may be part glass and part mesh.

I claim:

1. An eyeglass system comprising:
   a frame having a left side edge and a right side edge;
   a left side shield hingedly connected to the frame at a location inset from the left side edge and a right side shield hingedly connected to the frame at a location inset from the right side edge,
   wherein each of the left side shield and the right side shield comprises a substantially C-shaped cross section, adapted to align substantially against an adjacent portion of the frame when in a closed condition so as to provide a wearer of the eyeglass system a protective area against external elements entering from the side, top or bottom of the frame,
   the left and right side shields each extending substantially perpendicular to the frame in an open condition and rotating until the side shields are substantially parallel to the frame in a closed condition;
   a left arm coupled to the left side shield and a right arm coupled to the right side shield, the left and right arms having a retracted position to keep the left side arm from extending past the right side edge and the right side arm from extending past the left side edge when the side shields are in the closed condition; and
   left and right arm user select mechanisms for releasing the left and right arm from a retracted position to a protracted position;
   wherein the left side shield is hingedly connected to the frame at a location inset substantially 22 mm from the left side edge, and the right side shield is hingedly connected to the frame at a location inset substantially 22 mm from the right side edge.

2. An eyeglass system comprising:
   a frame having a left side edge and a right side edge;
   a left side shield hingedly connected to the frame at a location inset substantially 22 mm from the left side edge and a right side shield hingedly connected to the frame at a location inset substantially 22 mm from the right side edge,
   wherein each of the left side shield and the right side shield comprises a frame in substantially C-shaped cross section for holding a protective surface, adapted to align substantially against an adjacent portion of the frame when in a closed condition so as to provide a wearer of the eyeglass system a protective area against external elements entering from the side, top or bottom of the frame,
   wherein the left side shield is hingedly connected to the frame by a first left hinge connected to a top edge of the frame and a second left hinge connected to a bottom edge of the frame, and the right side shield is hingedly connected to the frame by a first right hinge connected to a top edge of the frame and a second right hinge connected to a bottom edge of the frame,
   the left and right side shields each extending substantially perpendicular to the frame in an open condition and rotating until the side shields are substantially parallel to the frame in a closed condition;
   a left arm coupled to the left side shield and a right arm coupled to the right side shield, the left and right arms having a retracted position to keep the left side arm from extending past the right side edge and the right side arm from extending past the left side edge when the side shields are in the closed condition; and
   left and right arm user select mechanisms for releasing the left and right arm from a retracted position to a protracted position;
   wherein the left and right arms comprise a cavity for housing a biasing mechanism, the biasing mechanism being compressed when the arms are in the retracted position and the biasing being decompressed when the arms are in the protracted position.

* * * * *